Aug. 7, 1934.   J. C. BARRY   1,969,495

POWER SYSTEM

Filed Dec. 8, 1932

Inventor:
John C. Barry,
by Charles E. Tullar
His Attorney.

Patented Aug. 7, 1934

1,969,495

UNITED STATES PATENT OFFICE 1,969,495

POWER SYSTEM

John C. Barry, Erie, Pa., assignor to General Electric Company, a corporation of New York Application December 8, 1932, Serial No. 646,273

17 Claims. (Cl. 171—223)

My invention relates to power systems for self-propelled vehicles wherein a prime mover is arranged to drive a generator which, in turn, supplies current for driving electric motors connected to the axles of the vehicle.

In power systems of this kind it is common to employ an internal combustion engine as the prime mover, and in such case the maximum power output of the engine is obtained at normal speed and with full throttle opening. The load on the prime mover is determined by the voltage-current characteristics of the generator connected thereto. Since the prime mover supplies substantially constant power output for any particular throttle setting, it is desirable to provide a generator which will constitute a substantially constant load on the prime mover throughout the range of voltage and current variation of the generator. Such a generator will utilize the full power output of the prime mover over the entire range of operation of the power system.

It is an object of my invention to provide a power system for self-propelled vehicles in which an engine drives a generator having an electrical characteristic such that the engine will operate at substantially constant power output for any particular setting of the engine throttle.

Further objects and advantages of my invention will become apparent as the following description proceeds and the features of novelty which characterize my invention will be pointed out with particularity in the claims annexed to and forming a part of this specification.

Figure 1:
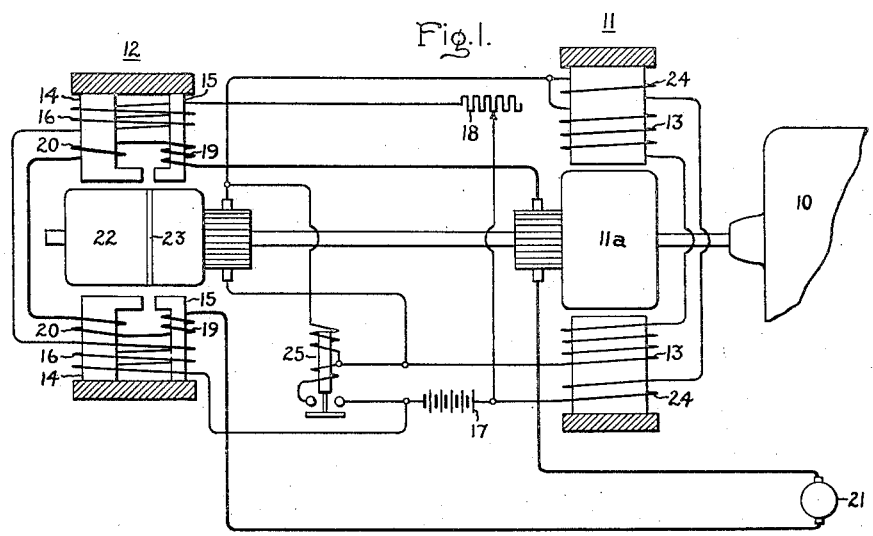
Figure 2:
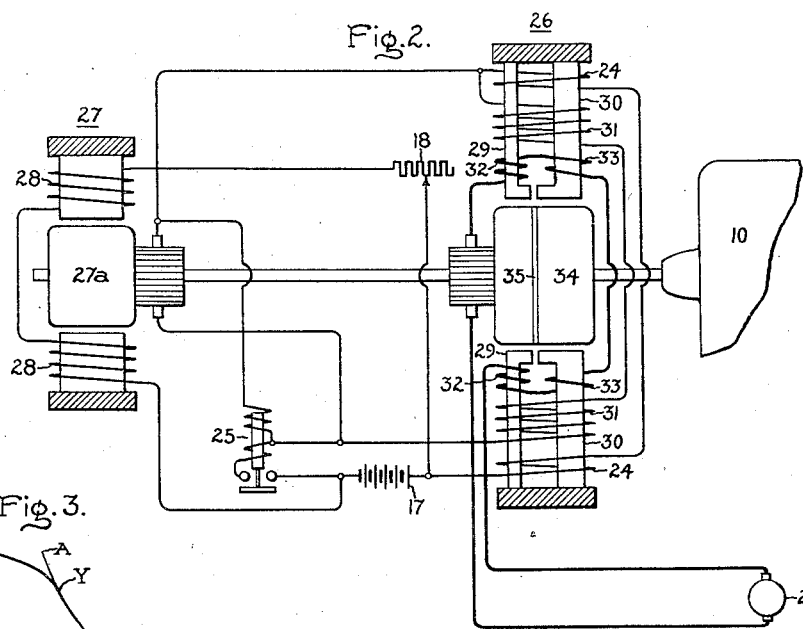
Figure 3:
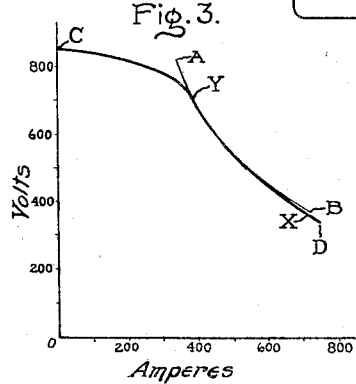

For a better understanding of my invention, reference may be had to the accompanying drawing in which Fig. 1 is a diagrammatic view of a power system for self-propelled vehicles embodying my invention; Fig. 2 is a diagrammatic view of a modified form of a power system similar to that shown in Fig. 1; and Fig. 3 is a curve showing the voltage-current characteristic of the generators of Figs. 1 and 2.

Referring now to the drawing, the power system shown in Fig. 1 comprises a prime mover 10, such as an internal combustion engine, connected by a common shaft to drive a generator 11 and an exciter or auxiliary generator 12. The prime mover 10 is of a type which operates at constant speed, and the constant power developed by the prime mover for a particular load can be conveniently represented by a voltage-current curve, which is indicated in Fig. 3 by the equilateral hyperbola A—B. In order that the generator shall utilize the maximum power output of the prime mover it is necessary that the voltage current characteristic of the generator corresponds to the equilateral hyperbola A—B which represents the power characteristic of the prime mover for full throttle opening and constant speed.

In accordance with my invention, I provide a system of the above described type in which the generator characteristic corresponds very closely to the constant horse-power characteristic of the prime mover over the working range of current and voltage of the generator under all conditions of load. I obtain this characteristic by employing an arrangement of the field structure of either the generator or the exciter wherein the polar projections are divided into magnetically separate portions transversely of the axis of the armature of the machine, and by providing on one of the portions of each pole a differential series field exciting winding connected in series with the load circuit of the generator. This construction, in which the poles are divided transversely of the armature axis, provides uniform and symmetrical distribution of flux about the armature axis which minimizes commutation difficulties and noise and, at the same time, provides for the required variation of flux in response to changes of the load current of the system. The characteristic of a generator embodying my invention is shown in Fig. 3 as indicated by the curve C—D. From the curves A—B and C—D it will be apparent that the generator utilizes the maximum power output of the prime mover over substantially the entire working range of the system.

In the embodiment of my invention shown in Fig. 1 the generator 11 is provided with an armature 11ª and an excitation system comprising the main field exciting winding 13 connected directly across the armature of the exciter 12. The exciter 12 is provided with field poles each divided transversely of the axis of rotation of the armature of the exciter into portions 14 and 15. This division may be made by an air gap, a sheet of non-magnetic material, or by any other arrangement which will provide magnetically separate portions in the poles. On these poles are arranged main separately excited field exciting windings 16 surrounding both the portions 14 and 15 and energized by a battery 17 connected in series with the winding 16 through a variable resistance 18. This winding supplies excitation sufficient to saturate the pole portion 15, but does not saturate the portion 14. In addition to the main field exciting windings 16 the exciter is provided with field exciting windings 19 and 20 connected in series with the generator load circuit. The series windings 19 are differential windings on the pole portions 15 which are sufficiently strong to overcome the main field at the balance point Y on Fig. 3. As the generator load current increases beyond this point, these windings 19 saturate the portions 15 in the reverse polarity. The series windings 20 surround only the portions 14 and are arranged to act cumulatively with the main field exciting windings, the combined effect of these windings being sufficient to saturate the pole portions 14 with any current higher than that at point Y on Fig. 3. The strength of these series fields varies with the current drawn by the load represented by the traction motor 21.

The exciter armature 22 is provided with a winding which may be of the series, the multiple, or any other type, since the distribution of the magnetic flux produced by the field exciting windings is equal and uniform for each pole. The magnetic core of the armature is divided into two distinct paths by a non-magnetic spacer 23, which may be of any construction that will provide magnetically separate portions in the armature core. This non-magnetic spacer serves to reduce circulatory flux when the portions 14 and 15 of the field poles are of opposite polarity, which occurs when the differential field overcomes the main field in the portions 15. The non-magnetic spacer also tends to confine the flux to definite paths across the armature under all conditions of field excitation.

A circuit is provided for charging battery 17 by placing the battery across the terminals of the armature 22 of the exciter 12 in series with an auxiliary winding 24 on the poles of the generator 11. This winding 24 also furnishes part of the generator excitation. A reverse current relay 25 is provided in order that the charging circuit of battery 17 may be closed only when the voltage of the exciter is higher than that of the battery.

In the operation of the power system shown in Fig. 1, when the load circuit of the generator 11 is closed as by connection to the traction motor 21 in starting the vehicle, the current output of the generator is high and the voltage is low. This condition corresponds to a point marked X in Fig. 3. Under this condition the portions 15 of the exciter 12 are saturated with polarity opposite to the flux produced by the windings 16 by the series field exciting windings 19 which overbalances the effect of the windings 16. As the vehicle starts, the load current of the generator decreases, and the effect of the series field exciting windings 20 also decreases and the portions 14 become less saturated. The other portions 15 of the poles also become less saturated and the flux therein decreases somewhat. With further decrease of load current the effect of the series differential field exciting windings 19 gradually decreases, until it reaches the point Y in Fig. 3 where the series differential field exciting windings balance the effect of the separately excited field windings 16 in the portion 15 of the poles of the exciter 12. At this point the reverse flux in portions 15 is reduced to zero. Upon any further decrease in current the exciter voltage will increase at a much lesser rate than during the major portion of the operating curve. The cumulative series field excitings 20 are provided to produce a lower no-load exciter voltage. It is apparent, since the flux of the cumulative compound pole portions 14 is produced in part by the series field, that less main field turns will be required. Consequently at no-load when there are no series ampere-turns the total flux is less than in a machine having no cumulative field, and hence the no-load voltage will be lower. At zero generator load, the portion 15 is saturated by winding 16 with flux in the same direction as the flux in portion 14. The system is designed with the exciter voltage proportioned so that the excitation derived therefrom by fields 13 and 24 on generator 11 will produce a normal operating range of generator voltage and current which will lie along the portion X—Y of the curve C—D conforming to the constant horse power curve A—B of the prime mover.

In Fig. 2 of the drawing I have shown another arrangement of the power system giving the desired voltage-current characteristics of the generator. In this embodiment of my invention, the generator instead of the exciter is provided with the series differential and cumulative field exciting windings such as those on the exciter shown in Fig. 1. In this modification, I provide a prime mover 10, a generator 26 and an exciter 27. Exciter 27 is provided with an armature 27$^a$ and separately excited field windings 28. The generator 26 is constructed similarly to the exciter 12 in Fig. 1, the field poles being divided transversely of the generator axis into portions 29 and 30. Main field exciting windings 31 together with auxiliary battery charging windings 24 are arranged to energize both portions of each pole and are connected across the armature of exciter 27. Differential series field exciting windings 32 and cumulative series field exciting windings 33 are arranged on the pole portions 29 and 30 respectively. The cross section of pole portions 29 is sufficiently small to permit saturation by the main field exciting windings 31 and 24, and also by the differential field exciting windings 32 after they have overbalanced the main field, and the cross section of pole portions 30 is such that the portion 30 will be saturated by the combined main and cumulative fields under heavy load conditions. The armature 34 of the generator 26 is provided with a winding of any type such as series or multiple, according to the desired design, and the magnetic core is divided by a transverse non-magnetic spacer indicated at 35 which serves to confine the flux to the armature path and minimize circulatory flux between the portions of the poles. The load circuit of the generator includes the field exciting windings 32 and 33, and the traction motor 21. The battery charging circuit is the same as that of Fig. 1, and the various parts have been designated by the same reference characters.

The characteristics of the power system shown in Fig. 2 can be represented by characteristic curves similar to those of Fig. 1 and as shown in Fig. 3. In this arrangement the excitation of the main field 31 of the generator 26 remains substantially constant, since it is supplied by the exciter 27 which is operated at a constant speed for any particular torque developed by the prime mover and separately excited from a constant voltage source. When maximum load is supplied to the generator load circuit, as in the starting of a self-propelled motor vehicle, the current in the series windings is at a maximum and the portions 29 of the generator field pole structure are saturated by the series field exciting windings 32 acting in opposition to the separately excited field windings 31 and 24. This condition corresponds to the lower end of the curve C—D indicated at X. As the vehicle starts and the load is decreased the series current decreases and the effect of the differential field exciting windings 32 is lessened, and, as a result, the portions 29 become less saturated. With decrease of the series current the characteristic follows along the portion X—Y of the curve C—D. At the point Y the effect of the differential field exciting windings 32 has been overcome by the separately excited field windings 31 and 24, and any further decrease in the load current will result in a smaller voltage rise in proportion. Here, as in the modification of Fig. 1, the cumulative series field is provided to reduce the voltage generated at no-load when only the main fields are excited.

It will thus be seen that either of the modifications shown in Figs. 1 and 2 provides a voltage current characteristic of the generator which conforms closely to the maximum power characteristic of the prime mover and effectively utilizes the power of the prime mover throughout the range of current and voltage of the generator.

From the foregoing it is apparent that I have provided a power system for self-propelled vehicles and the like, wherein a prime mover drives a generator for supplying the traction motors connected to the axles of the vehicle, and wherein the generator loads the prime mover to substantially the maximum power output thereof throughout the range of voltage and current in the operation of the power system.

While I have described a particular embodiment of my invention in connection with a self-propelled vehicle, further modifications will be apparent to those skilled in the art, I do not desire my invention to be limited to the particular application and construction set forth, and I intend in the appended claims to cover all modifications which do not depart from the spirit and scope of my invention.

What I claim as new and desire to secure by Letters Patent of the United States is:

1. A power system including a generator having a main field exciting winding, a load circuit connected to said generator, an auxiliary generator having a main field exciting winding, means for driving said generators, means for energizing the main field exciting winding of said auxiliary generator, means including said auxiliary generator for energizing the main field exciting winding of said first mentioned generator, one of said generators comprising a plurality of poles each having a portion adjacent one end of the generator provided with a differential field exciting winding thereon, said main field exciting winding of said one generator exciting all portions of each of said poles in the same direction, and means connecting said differential field exciting windings in said load circuit for saturating said portion of each of said poles at a predetermined maximum load current in said load circuit.

2. A power system including a generator having a main field exciting winding, a load circuit connected to said generator, an auxiliary generator having a main field exciting winding, means for driving said generators, means for energizing the main field exciting winding of said auxiliary generator, means including said auxiliary generator for energizing the main field exciting winding of said first mentioned generator, one of said generators comprising a plurality of poles each having a portion adjacent one end of the generator provided with a differential field exciting winding thereon and each having a portion adjacent the other end of the generator provided with a cumulative field exciting winding thereon, said main field exciting winding of said one generator exciting all portions of each of said poles in the same direction, and means for connecting said differential and cumulative field exciting windings in said load circuit.

3. A power system including a generator having a field exciting winding, a load circuit connected to said generator, means including an exciter for energizing said winding, said exciter having a plurality of poles and a main field exciting winding arranged on said poles, means for driving said generator and said exciter, means for energizing the main field exciting winding of said exciter, each of said exciter poles being divided transversely of the axis of said exciter into magnetically separate portions, said main field exciting winding being arranged to energize all portions of each of said exciter poles in the same direction, a differential field exciting winding arranged on one of said portions of each of said poles, and means for connecting said differential field exciting windings in said load circuit.

4. A power system including a generator having a field exciting winding, a load circuit connected to said generator, means including an exciter for energizing said winding, said exciter having a plurality of poles and a main field exciting winding arranged on said poles, means for driving said generator and said exciter, means for energizing the main field exciting winding of said exciter, each of said exciter poles being divided transversely of the axis of the exciter into magnetically separate portions, said main field exciting winding being arranged to energize all portions of each of said exciter poles in the same direction, a differential field exciting winding on one of said portions of each of said poles, a cumulative field exciting winding on another of said portions of each of said poles, and means for connecting said differential and cumulative field exciting windings with said load circuit.

5. A power system including a generator having a field exciting winding, a load circuit connected to said generator, means including an exciter for energizing said winding, said exciter having a plurality of poles and a main field exciting winding arranged on said poles, means for driving said generator and said exciter, means for energizing the main field exciting winding of said exciter, each of said exciter poles being divided transversely of the axis of said exciter into two magnetically separate portions of unequal cross-sectional area, said main field exciting winding being arranged to energize both of said portions of each of said exciter poles in the same direction, a differential field exciting winding arranged on the portions of said exciter poles having the smaller cross-sectional area, and means for connecting said differential field exciting winding in said load circuit.

6. A dynamo-electric machine including stationary and rotatable members having a plurality of field poles, a main field exciting winding for said poles, and means including a differential field exciting winding on each of said poles for opposing the flux produced by said main field exciting winding at one side only of said pole adjacent one end of said rotatable member and for saturating said poles on said one side only at a predetermined maximum load current in said machine.

7. A dynamo-electric machine including stationary and rotatable members, one of said members having a plurality of field poles each divided transversely of the axis of said rotatable member to form magnetically separate pole portions, a main field exciting winding surrounding all portions of each of said poles, and means including a differential field exciting winding surrounding one portion of each of said poles for saturating said one portion at a predetermined maximum load current in said machine.

8. A dynamo-electric machine including an armature, a plurality of field poles each divided transversely of the axis of said armature to form magnetically separate pole portions, a main field exciting winding surrounding all portions of each of said poles, and means including a differential field exciting winding surrounding one portion of each of said poles for saturating said one portion at a predetermined maximum load current in said machine.

9. A dynamo-electric machine including a wound armature, a plurality of field poles each divided transversely of the axis of said armature to form magnetically separate pole portions, a main field exciting winding surrounding all portions of each of said poles, means including a differential field exciting winding surrounding one portion of each of said poles for saturating said one portion at a predetermined maximum load current in said machine, and a cumulative field exciting winding surrounding another portion of each of said poles, said differential and said cumulative field windings being connected in series with the windings of said armature.

10. A dynamo-electric machine including a wound armature having a magnetic core, means for dividing said core into magnetically separate sections transversely of the axis of said armature, a plurality of field poles each divided transversely of the axis of said armature to form magnetically separate pole portions corresponding to the magnetically separate sections of said armature, a main field exciting winding surrounding all portions of each of said poles, and means including a differential field exciting winding surrounding one portion of each of said poles and arranged in series with the windings of said armature for saturating said one portion at a predetermined maximum load current in said machine.

11. A dynamo-electric machine including stationary and rotatable members, one of said members having a plurality of field poles each divided transversely of the axis of rotation of said rotatable member to form magnetically separate pole portions, means including a main field exciting winding surrounding all portions of each of said poles for saturating one of said portions in a predetermined polarity, and means including a differential field exciting winding arranged on said one portion of said poles for saturating said one portion in the opposite polarity and in opposition to said main field exciting winding.

12. A power system including a generator having a field exciting winding, a load circuit for said generator, means including an exciter for energizing the field exciting winding of said generator, means for driving said generator and said exciter, said exciter having a plurality of field poles each divided transversely of the axis of said exciter into magnetically separate portions, means including a separately excited field winding on each of said field poles for energizing all of said separate portions of each of said poles in the same direction, and means including a differential field exciting winding in said load circuit and arranged on a portion of each of said field poles for varying the energization of said field poles symmetrically about the axis of said exciter to maintain the power output of said generator substantially constant over the normal range of voltage and current of said generator.

13. A power system including a main generator having a main field exciting winding, a load circuit connected to said generator, means including an auxiliary generator having a main field exciting winding for energizing the main field exciting winding of said main generator, means for driving said generators, one of said generators having a plurality of field poles divided transversely of the axis of rotation of said generator into portions of unequal size, the main field exciting winding on said divided poles being sufficiently strong to saturate the smaller portion of each of said poles and being arranged to energize all portions of each of said poles in the same direction, and means including a differential field exciting winding arranged on said smaller portions for saturating said portions in opposition to the main field exciting winding on said poles at a predetermined maximum current in said load circuit, said differential field exciting winding being connected in said load circuit.

14. A power system including a generator having a field exciting winding, a load circuit connected to said generator, means including an exciter for energizing said winding, said exciter having a plurality of poles and a field exciting winding arranged on said poles, means for energizing the main field exciting winding of said exciter, means for driving said generator and said exciter, each of said exciter poles being divided transversely of the axis of rotation of said exciter into magnetically separate portions, said main field exciting winding being arranged to energize all portions of each of said exciter poles in the same direction, and means including a differential field exciting winding arranged on one of said portions of each of said poles and connected in said load circuit for saturating said one portion of each of said poles at a predetermined maximum current in said load circuit.

15. A power system including a generator having field exciting winding, a load circuit connected to said generator, means including an exciter for energizing said winding, said generator having a plurality of poles each divided transversely of the axis of rotation of said generator into magnetically separate portions, said field exciting winding being arranged to energize all portions of each of said poles in the same direction, means for driving said generator and said exciter, and means including a differential field exciting winding arranged on one of the portons of each of said generator poles and connected in series in said load circuit for saturating said one portion of each of said poles at a predetermined maximum current in said load circuit.

16. A power system including a generator and a load circuit connected thereto, a main field exciting winding for said generator, an exciter for energizing said main field exciting winding, said exciter having a plurality of field poles each divided transversely of the axis of rotation of said exciter into two portions of unequal size, means including a main field exciting winding arranged on both portions of each of said exciter poles for energizing said poles and for saturating the smaller portions of said poles at predetermined low current conditions in said load circuit, and means including a differential field exciting winding connected in series in said load circuit and arranged on said smaller portions of said poles for saturating said smaller portions in a direction opposite to that of said main field exciting winding on said poles at predetermined maximum current in said load circut.

17. A power system including a main generator having a field exciting winding, a load circuit connected to said generator, means including an auxiliary generator for energizing the field exciting winding of said main generator, means for driving said generators, a field exciting winding for said auxiliary generator, means for energizing the field exciting winding of said auxiliary generator, one of said generators having a plurality of field poles each divided transversely of the axis of rotation of said one generator into portions of unequal size, and means including differential field exciting windings arranged on the small portions of the poles of said one generator and inherently regulating said main generator for maintaining a substantially constant load on said main generator.

JOHN C. BARRY.